United States Patent [19]

Kusaka

[11] Patent Number: 5,754,224
[45] Date of Patent: May 19, 1998

[54] IMAGE SENSOR SYSTEM AND METHOD

[75] Inventor: Yosuke Kusaka, Kanagawa-ken, Japan

[73] Assignee: Nikon Corporation, Tokyo, Japan

[21] Appl. No.: 378,360

[22] Filed: Jan. 25, 1995

[30] Foreign Application Priority Data

Feb. 3, 1994 [JP] Japan .................. 6-011881

[51] Int. Cl.$^6$ .............. H04N 5/225; H04N 9/04; H04N 5/217
[52] U.S. Cl. .................. 348/207; 348/208; 348/241
[58] Field of Search ................. 348/207, 208, 348/241

[56] References Cited

U.S. PATENT DOCUMENTS

| | | | |
|---|---|---|---|
| 4,613,748 | 9/1986 | Imai . | |
| 4,811,303 | 3/1989 | Hirai | 365/189 |
| 5,227,834 | 7/1993 | Ishida | 354/402 |
| 5,272,536 | 12/1993 | Sudo | 358/213 |
| 5,331,420 | 7/1994 | Yamano et al. . | |
| 5,455,624 | 10/1995 | Ishibe | 348/340 |
| 5,592,613 | 1/1997 | Miyazawa et al. | 395/182.04 |

Primary Examiner—John K. Peng
Assistant Examiner—Vivek Srivastava
Attorney, Agent, or Firm—Oliff & Berridge, PLC

[57] ABSTRACT

An image sensor system transfers all correction data from a non-volatile memory to RAM. The image sensor system includes an analog-to-digital converter, a non-volatile memory, a RAM, a ROM, an IO port, a CPU and a serial communication device. The image sensor system stores correction data from the non-volatile memory in the RAM and uses the correction data in the RAM thereafter.

25 Claims, 12 Drawing Sheets

IMAGE SENSOR SYSTEM AND METHOD

BACKGROUND OF THE INVENTION

1. Field of the Invention

The present invention relates to an image sensor system and method that corrects data. The image sensor system may be used for a focus detection system of a camera.

2. Description of Related Art

In order to perform accurate focus detection, using data obtained by an image sensor, the dispersion of the characteristics (e.g., sensitivity, dark current characteristics, etc.) of a multiplicity of pixels included in the image sensor needs to be corrected.

FIG. 17 illustrates the structure of a conventional image sensor system that executes such data correction.

The image sensor system includes: a one-chip microcomputer 9; an image sensor 8 comprising a multiplicity of pixels having photo-electric conversion capability; and a nonvolatile memory (EEPROM, electrically erasable and programmable read only memory) 11 capable of electrical erasing and reading in order to store a multiplicity of correction data to correct the digital data corresponding to the multiplicity of pixels. The one-chip microcomputer includes: an analog-to-digital converter 190 to convert analog signals produced by the image sensor 8 into digital data corresponding to the multiplicity of pixels; a read only memory (ROM) 191, which stores a processing program to process the digital data; a volatile memory (RAM, random access memory) 192 capable of electrical erasing and reading; a central processing unit (CPU) 193 that executes programs; and a serial communication device 194 for allowing CPU 193 to read correction data from nonvolatile memory 11.

With such an image sensor system, the correction of digital data is conventionally accomplished as follows:

(i) Initially, analog signals produced by the image sensor 8 are converted into digital data by the analog-to-digital converter 190. The digital data are stored in the RAM 192 via a register housed within the CPU 193.

(ii) Next, the CPU 193 reads the digital data corresponding to one pixel from the RAM 192, and stores it in a register within the CPU 193.

(iii) The CPU 193 reads correction data for the one pixel from the nonvolatile memory 11 via the serial communication device 194 and stores it in another register within the CPU 3.

(iv) The CPU 193 executes a specified algorithm for the digital data stored within the register within the CPU 193 based upon the correction data stored in a separate register within the CPU 193 to generate corrected digital data, storing the corrected digital data in the RAM 192.

(v) Processes (ii), (iii), and (iv) are repeatedly executed for the digital data corresponding to each pixel.

(vi) The CPU 193 then executes processes such as a focus detection algorithm for all of the corrected digital data.

All of the processes (i), (ii), (iii), (iv), (v) and (vi) are executed by programs stored in the ROM 191.

However, with the conventional correction apparatus and method described above, the time required to correct all of the digital data becomes too long because the reading of the correction data from the nonvolatile memory to the CPU is accomplished serially by the serial communication device 194 at a relatively slow reading speed, resulting in poor response characteristics for the system as a whole.

SUMMARY OF THE INVENTION

It is an object of the present invention to eliminate the above-described problem and other problems in conventional devices by providing an image sensor system that corrects digital data corresponding to pixels by reading all correction data from a nonvolatile memory and storing all of the correction data in a volatile memory. The correction data is then accessed from the volatile memory.

In order to accomplish the above and other objects, the present invention provides an image sensor system that includes an image sensor having a multiplicity of pixels with photo-electric conversion capability; an analog-to-digital converter that converts analog signals produced by the image sensor into digital data corresponding to the multiplicity of pixels; a nonvolatile memory (EEPROM) capable of electrical erasing and reading, that stores the correction data; a volatile memory (RAM) capable of electrical erasing and reading with a higher data reading speed than the nonvolatile memory; a read only memory (ROM) that stores a correction data transfer program to transfer the correction data from the nonvolatile memory to the RAM, a correction program that corrects, using the correction data, the digital data AD-converted by the analog-to-digital converter and that stores it in the RAM, and a processing program that executes a predetermined process on the corrected digital data stored within in the RAM; and a central processing unit (CPU) that executes the corrected data transfer program, the correction program, and the processing program, wherein the CPU repeatedly executes the correction program and the processing program while starting and executing the correction data transfer program independent of the correction and processing programs.

With the present invention, all the correction data are read once from the nonvolatile memory and stored in the RAM in the manner described above. During the digital data correction algorithm, the correction data are read from the RAM. Because the RAM has a higher speed reading capability than the nonvolatile memory conventionally used, the present invention provides an image sensor system that operates more efficiently than conventional systems.

BRIEF DESCRIPTION OF THE DRAWINGS

The invention will be described in conjunction with the following drawings in which like reference numerals denote like element and wherein.

DETAILED DESCRIPTION OF PREFERRED EMBODIMENTS

Figure 1:
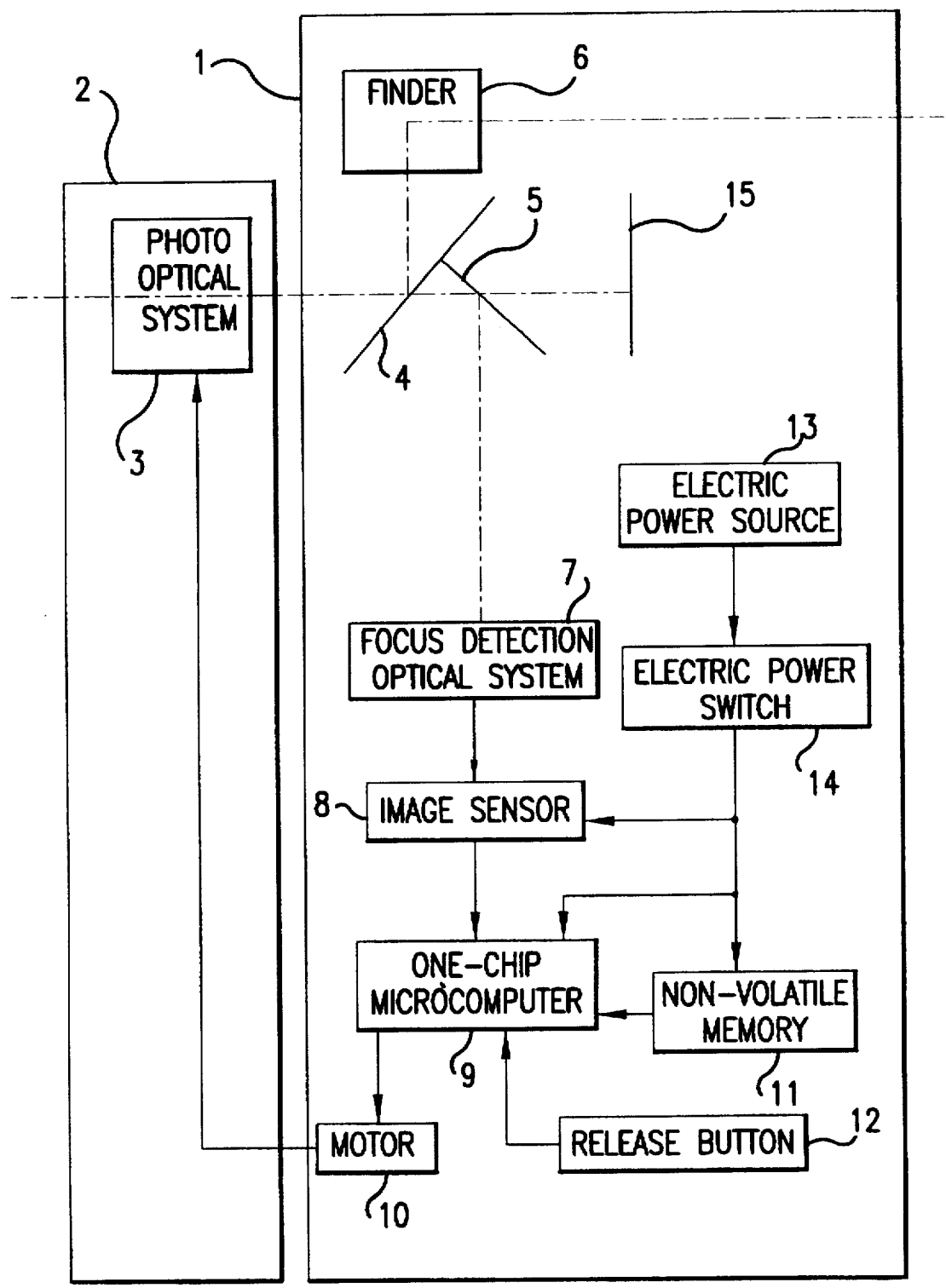
FIG. 1 is a block diagram illustrating an embodiment of the present invention.

FIG. 1 is a block diagram illustrating a configuration in which the image sensor system of the present invention is integrated as part of the automatic focus adjustment system of a camera.

A lens 2 is detachable from the body 1 of the camera. The lens 2 is shown mounted on the body 1 in FIG. 1.

A photo-optical system 3 is provided within the lens 2. Light rays from the subject pass through the photo-optical system 3 and are divided by the main mirror 4 into the directions of the sub-mirror 5 and the finder 6. The main mirror 4 is constructed of half mirrors.

The light rays directed to the sub-mirror 5 are bent by the sub-mirror 5 in the direction of the bottom of the body 1 and are guided by the focus detection optical system 7 located in the vicinity of a conjugate surface of the predicted focus surface 15 (film surface) in the photo-optical system 3. The light rays form a subject image on a light receiving unit of the image sensor 8.

A detailed description of the structure of the focus detection optical system 7 and the image sensor 8 according to an embodiment of the invention will be described later.

The image sensor 8 performs photo-electric conversion of the intensity distribution of the subject image onto the light receiving unit of the image sensor 8. Output signals from the image sensor 8 are directed to the one-chip microcomputer 9 where various processes are performed on the signals, as explained hereafter. As a result of these processes, the defocus amount DEF between the image surface of the photo-optical system 3 and the predicted focus surface 15 is detected.

The one-chip microcomputer 9 further accomplishes focusing of the photo-optical system 3 by controlling the driving of the motor 10, which drives the photo-optical system 3, to adjust the focus of lens 2 based on the defocus amount DEF.

Moreover, the nonvolatile memory 11, which may be an EEPROM, is a memory for storing the correction data to be used for correction of the output from the image sensor 8, as explained hereafter.

Power from the electric power source 13 is supplied to the image sensor 8, the one-chip microcomputer 9, and the nonvolatile memory 11 through the electric power source switch 14.

The release button 12 has two levels of depression, half-depression and full-depression. Automatic focusing commences with half-depression, while full-depression causes the shutter mechanism (not shown) to operate, resulting in exposure of the film.

Figure 2:
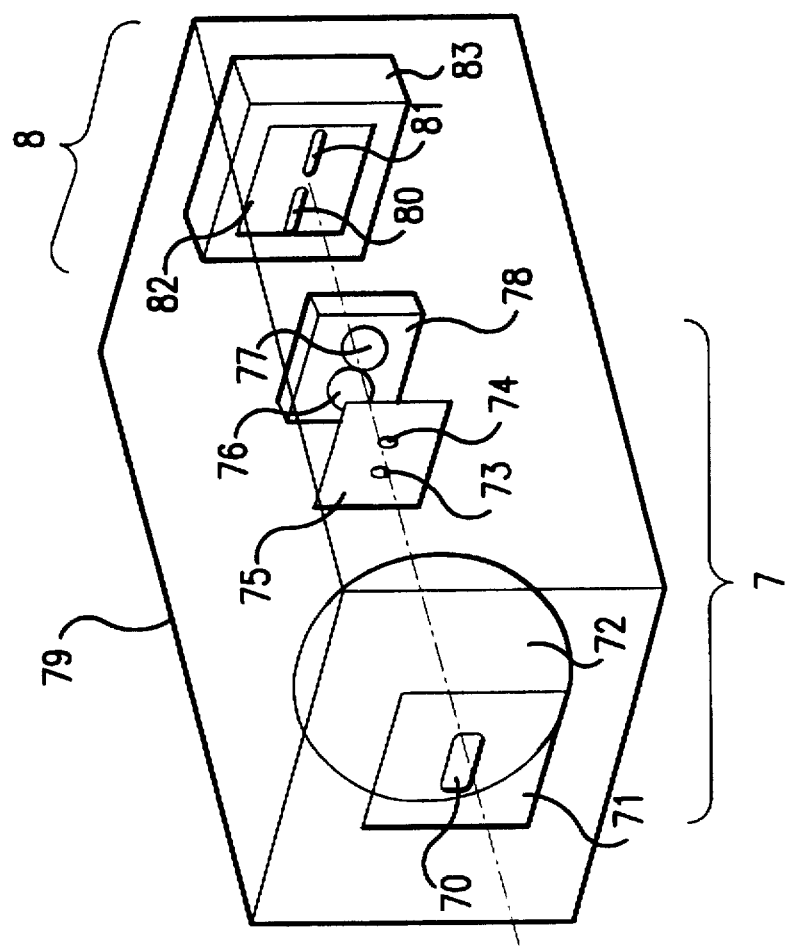
FIG. 2 is an oblique view of the focus detection optical system and the image sensor according to an embodiment of the present invention.
Figure 2:
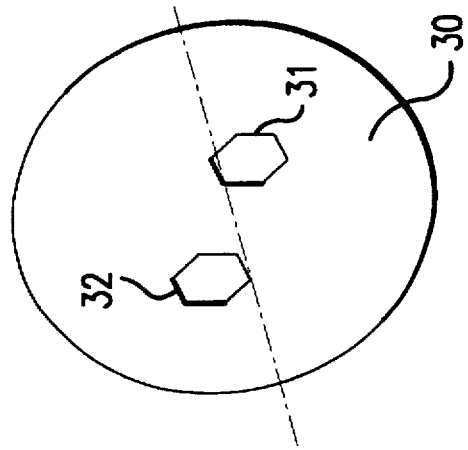

FIG. 2 illustrates the structure of the focus detection optical system 7, the image sensor 8, and the housing 79 of an embodiment of the present invention.

The focus detection optical system 7 is comprised of a vision mask 71 with an opening 70, a condenser lens 72, a diaphragm mask 75 with a pair of diaphragm openings 73 and 74, and a recomposition device 78 made of a plastic optical material. The recomposition device 78 includes a pair of recomposing lenses 76, 77 as one unit.

Image sensor 8 is comprised of a semiconductor circuit board 82 (chip, IC board) containing a pair of light receiving units 80 and 81, made of an electric charge accumulation type CCD and a package 83 (ceramic package) to house the semiconductor circuit board 82.

Each of the light receiving units 80 and 81 is comprised of a multiplicity of pixels of photo-electric conversion photo diodes arranged linearly with a specific pitch.

Electric charges produced by the light receiving units 80, 81 are transferred by an electric transfer charge device (not shown), such as a CCD shift register, and output as analog signals from the image sensor 8 in a time sequence. The electric charge accumulation operation of the light receiving units 80, 81 and the transfer operation of the electric transfer charge device are controlled by the one-chip microcomputer 9.

The housing 79 is comprised of a holder (not shown) attached to housing 79 for supporting the optical components that make up the focus detection optical system 7 and the image sensor 8.

The pair of diaphragm openings 73 and 74 are focussed by the condenser lens 72 onto a pair of regions 31 and 32 that are symmetric relative to the optical axis of the surface 30 in the vicinity of the exit pupil of the photo-optical system 3. The light rays passing through regions 31 and 32 form the primary image in the vicinity of the vision mask 71. The primary image formed in the opening component 70 of the vision mask 71 further passes through the condenser lens 72 and a pair of diaphragm openings 73 and 74 and is directed as a pair of secondary images by a pair of recomposition lenses 76 and 77 onto the light receiving units 80, 81 of the image sensor.

The relative positional relationship of the pair of secondary images varies depending upon the focus adjustment condition of the photo-optical system 3. Therefore, the relative positional relationship of the pair of secondary images is obtained by processing the electrical subject image signals obtained by photoelectric conversion of a pair of images formed on the light receiving units 80 and 81. The amount of defocus DEF, which shows the focus adjustment condition of the photo-optical system 3, is obtained based upon the relative positional relationship of the pair of secondary images.

Figure 3:
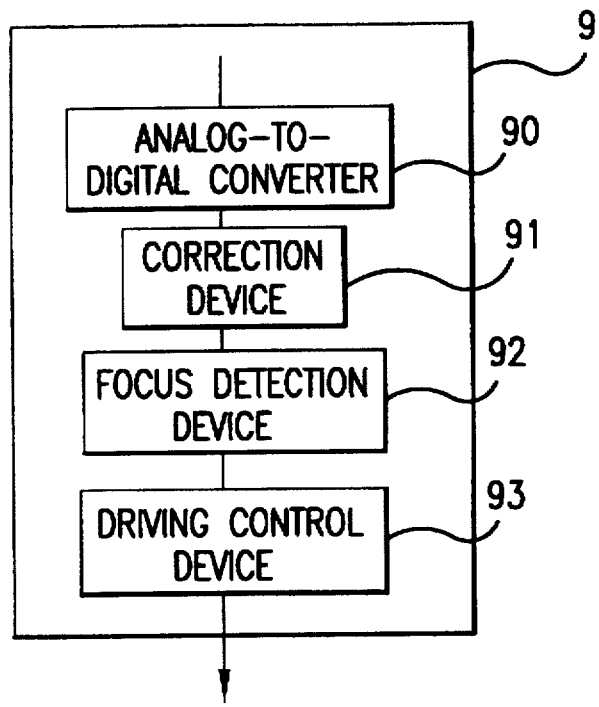
FIG. 3 is a block diagram illustrating the one-chip microcomputer of FIG. 1.

FIG. 3 is a block diagram illustrating the one-chip microcomputer 9 according an embodiment of the present invention.

The analog-to-digital converter 90 converts analog signals from the image sensor 8 into digital data. The correction device 91 corrects the digital data using correction data. Details of the operation of the correction device 91 are described hereafter, with reference to FIGS. 4–7.

Figure 4:
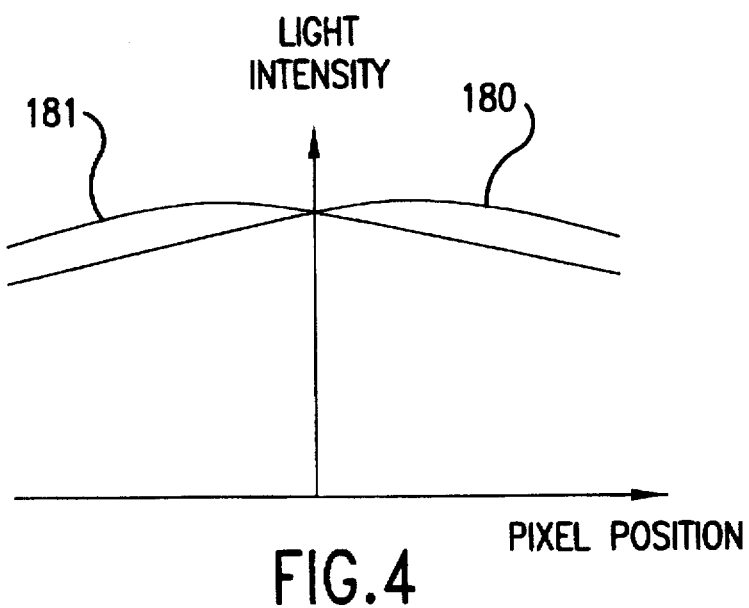
FIG. 4 is a graph illustrating the correction principle in an embodiment of the present invention.

In FIG. 4, reference numerals 180 and 181 represent the light intensity distribution formed on the light receiving units 80 and 81 of the image sensor 8 when the focus detection optical system 7 of FIG. 2 is applied to a subject with uniform illumination. Due to the characteristics of the focus detection optical system 7, the amount of light in the surrounding area drops, as may be seen in FIG. 4, resulting in a non-uniform intensity distribution. In FIG. 4, the horizontal axis represents the position of the pixels that comprise the light receiving units. That is, pixels further from the center receive less illumination.

Figure 5:
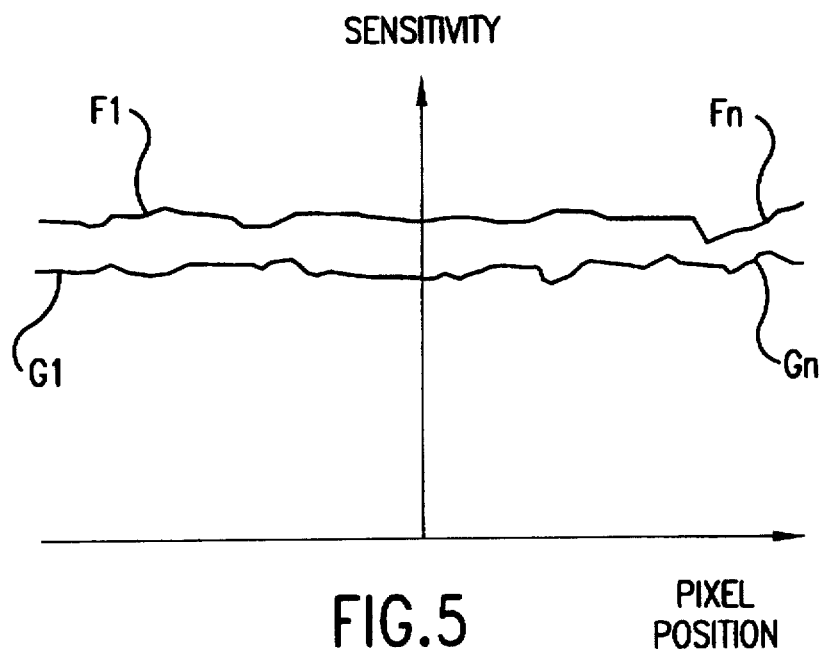
FIG. 5 is a graph illustrating the correction principle of an embodiment of the present invention.

FIG. 5 depicts the sensitivity F1-Fn of pixels $\alpha 1$-$\alpha n$ and the sensitivity G1-Gn of pixels $\beta 1$-$\beta n$, where $\alpha 1$-$\alpha n$ and $\beta 1$-$\beta n$ represent pixels in the order of the rows that comprise the light receiving units 80 and 81, respectively, n being the number of pixels. FIG. 5 shows the dispersion among pixels.

Figure 6:
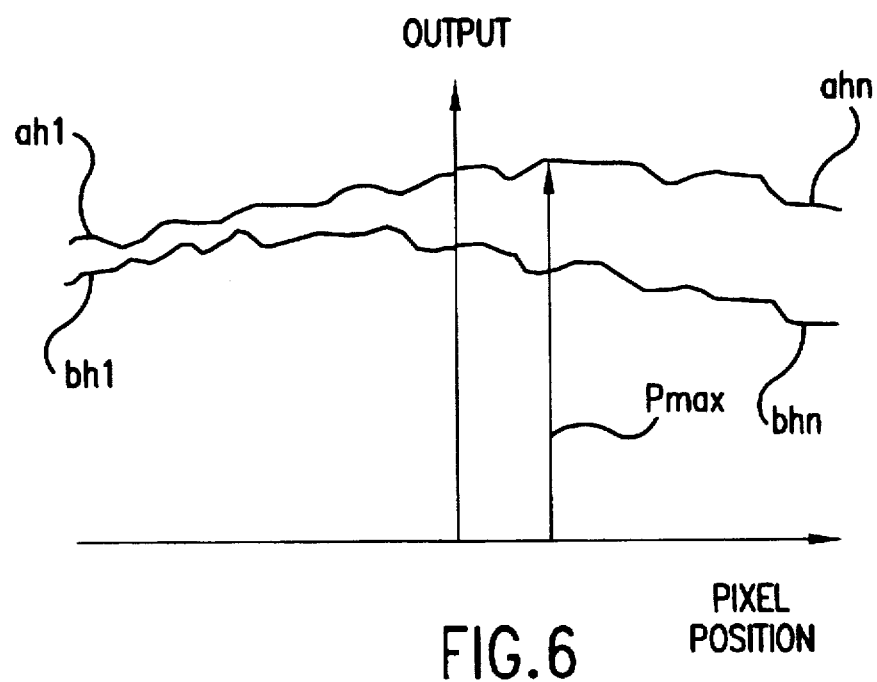
FIG. 6 is a graph illustrating the correction principle of an embodiment of the present invention.

FIG. 6 depicts the digital data ah1-ahn, which comprise the AD-converted analog signals from the pixels $\alpha 1$-$\alpha n$, and the digital data bh1-bhn, which comprise the AD-converted analog signals from pixels $\beta 1$-$\beta n$, when the focus detection optical system 7 of FIG. 2 is applied to a subject with uniform illumination to form a corresponding illumination distribution on the light receiving units 80 and 81 of the image sensor 8. In this instance, the digital data are obtained by multiplying the intensity distribution of FIG. 4 and the sensitivity of FIG. 5, in which the resultant digital data are not uniform. Since these values are meant to be uniform, a correction is needed to make the non-uniform values shown in FIG. 6 uniform. An example of such correction is described hereafter.

If Pmax denotes the maximum value of the digital data, ah1-ahn and bh1-bhn in FIG. 6, the correction data AH1-AHn for the digital data of pixels $\alpha 1$-$\alpha n$ and the correction data BH1-BHn for the digital data of pixels $\beta 1$-$\beta n$ are defined by equations 1.

$$AHi = (Pmax/ahi) - 1 \; i = 1 \sim n \quad (1)$$
$$BHi = (Pmax/bhi) - 1 \; i = 1 \sim n$$

The correction data AH1-AHn and BH1-BHn defined by equations 1 differs by combinations of the digital data ahi and bhi provided by the focus detection optical system 7 and the image sensor 8. Hence, the correction values are written on the nonvolatile memory 11 as adjustment values for each camera when the camera is assembled.

In general, corrections for the digital data a1-an of the pixels $\alpha 1$-$\alpha n$ and for the digital data b1-bn of the pixels $\beta 1$-$\beta n$ are computed by equations 2, thereby obtaining the corrected digital data A1-An and B1-Bn.

$$Ai = ai \times (1 + AHi) \; i = 1 \sim n \quad (2)$$
$$Bi = bi \times (1 + BHi) \; i = 1 \sim n$$

Corrections of the digital data according to equations 2 take place in the correction device 91.

Figure 7:
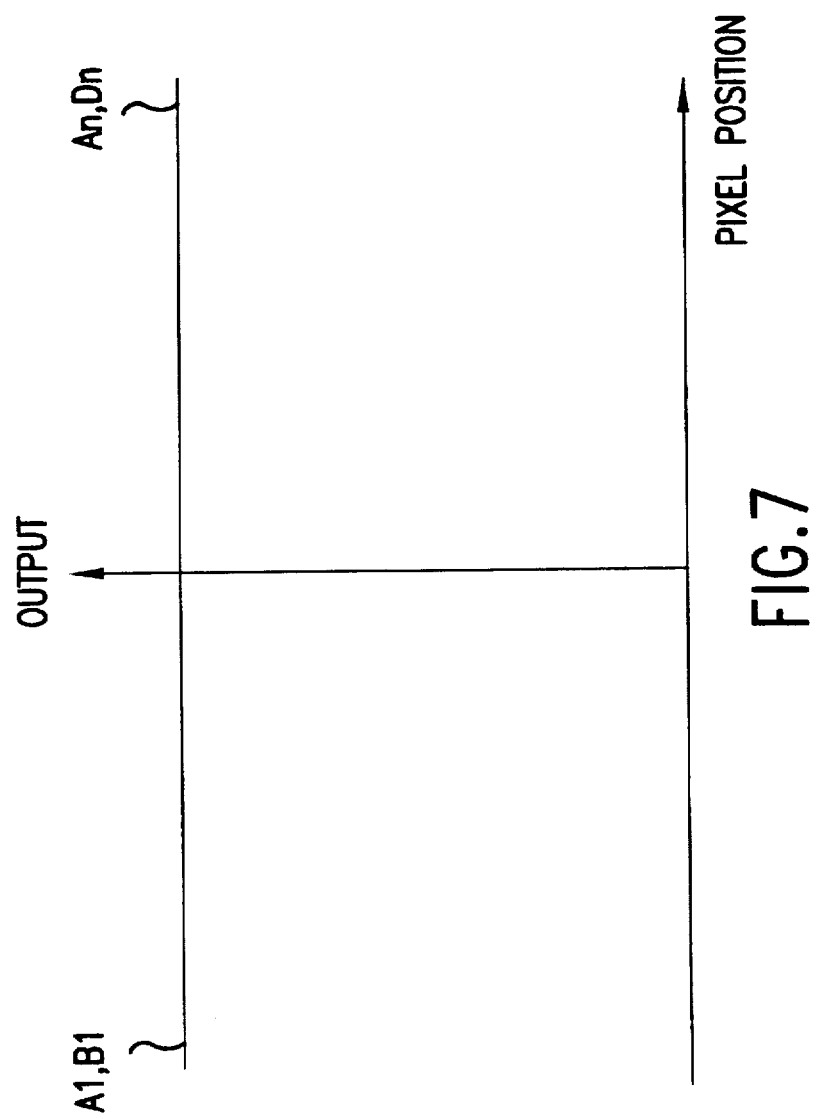
FIG. 7 is a graph illustrating the correction principle of an embodiment of the present invention.

FIG. 7 illustrates corrections made by correction device 91 on the digital data ah1-ahn of pixels $\alpha 1$-$\alpha n$ and on the digital data bh1-bhn of pixels $\beta 1$-$\beta n$ for a subject having data with uniform illumination. The corrected digital data A1-An and B1-Bn assume a uniform value of Pmax, as may be seen with reference to FIG. 7.

Focus detection computations are accomplished by the focus detection device 92 in order to obtain the relative positional relationship of the pair of images formed on the light receiving units 80 and 81, based upon the corrected digital data A1-An and B1-Bn. An example of the algorithm used in the focus detection computations is described hereafter.

Initially, a correlation amount C (L) is obtained by the differential correlation algorithm shown in equation (3).

$$C(L) = \sum_{i=j}^{j+m} |A(i+L) - B(i)| \quad (3)$$

L represents an integer representing a relative shift amount, with the pixel pitch comprising the units. Moreover, j represents a value corresponding to the shift amount L, in which the range of L in equation (3) is Lmin-Lmax. Furthermore, m is a predetermined value. The results of computations according to equation 3 indicate that the correction amount C (L) is at the minimum level when the shift shows a high correlation between the pair of data A1-An and B1-Bn. Next, the shift amount x, which gives the minimum value C (L) min=C (x) for the continuous correlation amount, is obtained by a three point containment method using equations (4)-(7).

$$x = kj + D/SLOP \quad (4)$$
$$C(x) = (kj) - |D| \quad (5)$$
$$D = \{C(kj-1) - C(kj+1)\}/2 \quad (6)$$
$$SLOP = MAX(C(kj+1) - C(kj), C(kj-1) - C(kj)) \quad (7)$$

Using the shift amount x obtained in equation 4, the defocus amount DEF of the subject image surface against the predicted focus surface is given by equation (8).

$$DEF = KX \cdot PY \cdot X \quad (8)$$

In equation 8, PY represents the pitch of the pixels comprising the light receiving unit of a sensor in the direction of the rows, while KX represents the conversion coefficient determined by the composition of the focus detection optical system 7.

Based upon the defocus amount DEF obtained in equation 8, the driving control device 93 computes the amount of lens driving necessary to focus lens 2. The driving control device then causes motor 10 to adjust the focusing position of the photo-optical system 3.

Figure 8:
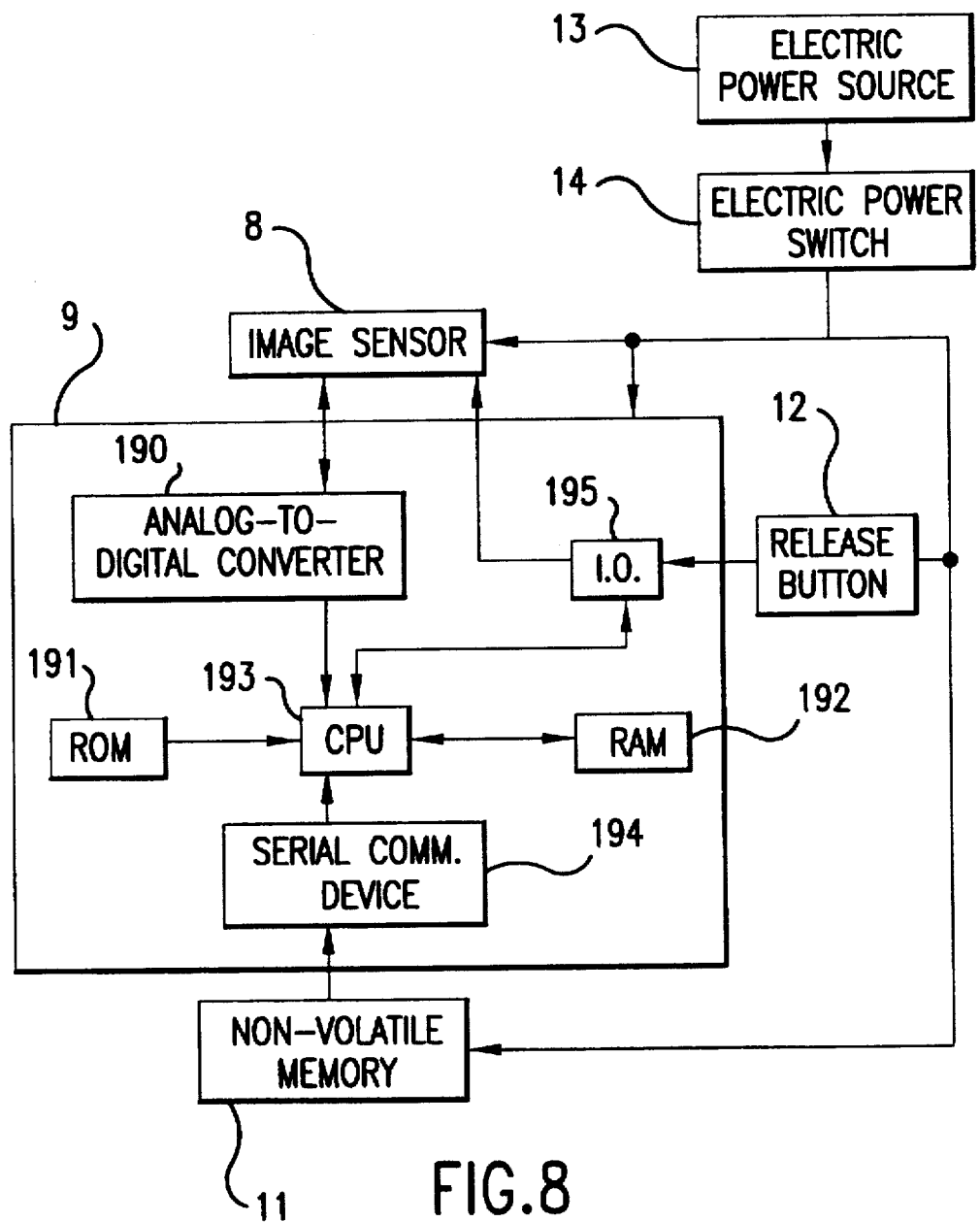
FIG. 8 is a block diagram illustrating the circuit of the one-chip microcomputer of FIG. 1.

FIG. 8 illustrates the semiconductor circuit board of the one-chip microcomputer 9 of FIG. 1. The one-chip microcomputer 9 is comprised of the analog-to-digital conversion device 190, a read only memory (ROM) 191, a volatile memory (RAM) 192 capable of electrical writing and erasing with a higher data reading speed than the nonvolatile memory 11, a central processing unit (CPU) 193, a serial communication device 194, and an input/output device (IO port) 195. Also shown in FIG. 8 are the devices outside the one-chip microcomputer 9 including the nonvolatile memory 11, the image sensor 8, a release button 12, a power source 13, and a power source switch 14. The one-chip microcomputer 9, the CPU 193, the analog-to-digital conversion device 190, the ROM 191, the RAM 192, the serial communication device 194, and the IO port 195 are connected by means of a parallel data bus.

The correction data AH1-AHn and BH1-BHn are read from the nonvolatile memory 11 by the serial communication device 94. The correction data AH1-AHn and BH1-BHn read from the nonvolatile device 11 are stored in the RAM 192 via the CPU 193.

The present invention establishes the communication method with the nonvolatile memory 11 as a serial communication method so as to reduce the number of terminals of the one-chip microcomputer 9 relative to the corresponding number of terminals in the conventional parallel communication method.

The analog-to-digital converter 190 AD-converts analog signals from the image sensor 8 to digital data. The digital data are temporarily stored in a register within the CPU 193.

The CPU 193 reads from the RAM 192 the correction data corresponding to the AD-converted digital data and stores it in another register. The CPU 193 then executes the correction algorithm of equation (2) using the digital data and correction data stored in the register. The corrected digital data is then stored in the RAM 192.

The CPU 193 executes the focus detection algorithm of equations 3–8 using the corrected digital data A1-An and B1-Bn stored in the RAM 192, thereby obtaining the defocus amount DEF.

The IO port 195 is connected to the release button 12 and reads and enters the operational state of the release button 12 into the CPU 195. The IO port 195 is also connected to the image sensor 8 and communicates control commands from the CPU 193 to the image sensor 8. Additionally, the IO port 195 is connected to the motor 10 (connection not shown) and controls the driving of the motor 10 based upon commands from the CPU 193.

The operations of the CPU 193 described above are executed based upon the programs stored in the ROM 191. Operations of the CPU 193 are described hereafter, with reference to FIGS. 9–12 and Table 1.

Figure 9:
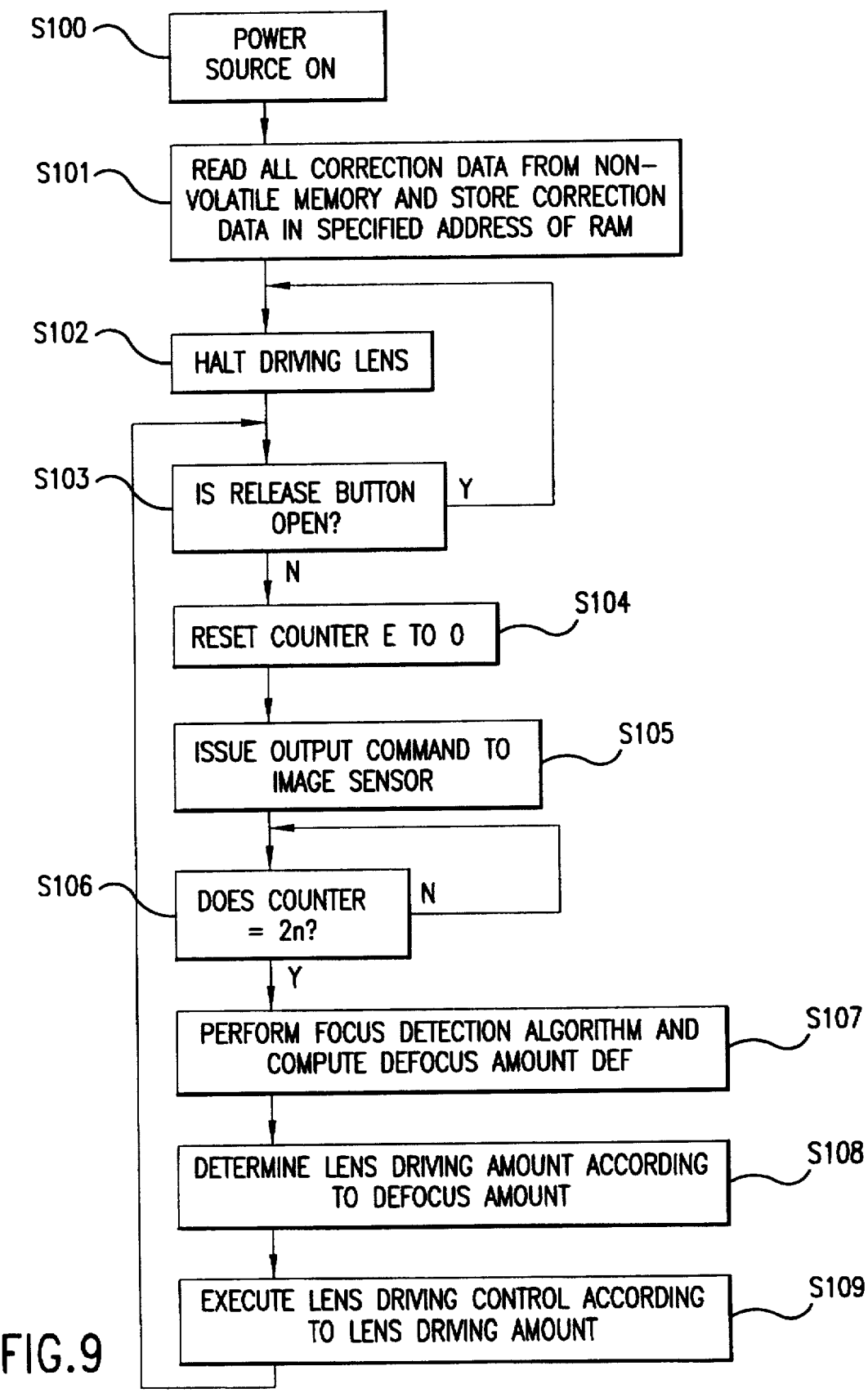
FIG. 9 is a flow chart illustrating the operation of an embodiment of the present invention.

FIG. 9 is a flow chart of the main program stored in the ROM 191 that operates the CPU 193.

At step S100, by closing the power source switch 14, power from the power source 13 is supplied to the one-chip microcomputer 9 (power source ON). The program then proceeds to step S101.

In step S101, the CPU 193 reads all of the correction data AH1-AHn and BH1-BHn from the nonvolatile memory 11 via the serial communication device 194 and stores it in the RAM 192 in the region shown in Table 1.

In step S102 the motor 10 is halted via the IO port 195. In step S103, the operational state of the release button 12 is detected to see if it is open or not via the IO port 195. If the release button 12 is open, steps S102 and S103 are repeated until it is no longer open.

When the photographer operates the release button 12, and it is no longer open, the CPU 193 moves to step S104 and begins the automatic focus adjustment operation. In step S104, the counter E used to count the number of pixels from the image sensor 8 is set to 0.

Figure 12:
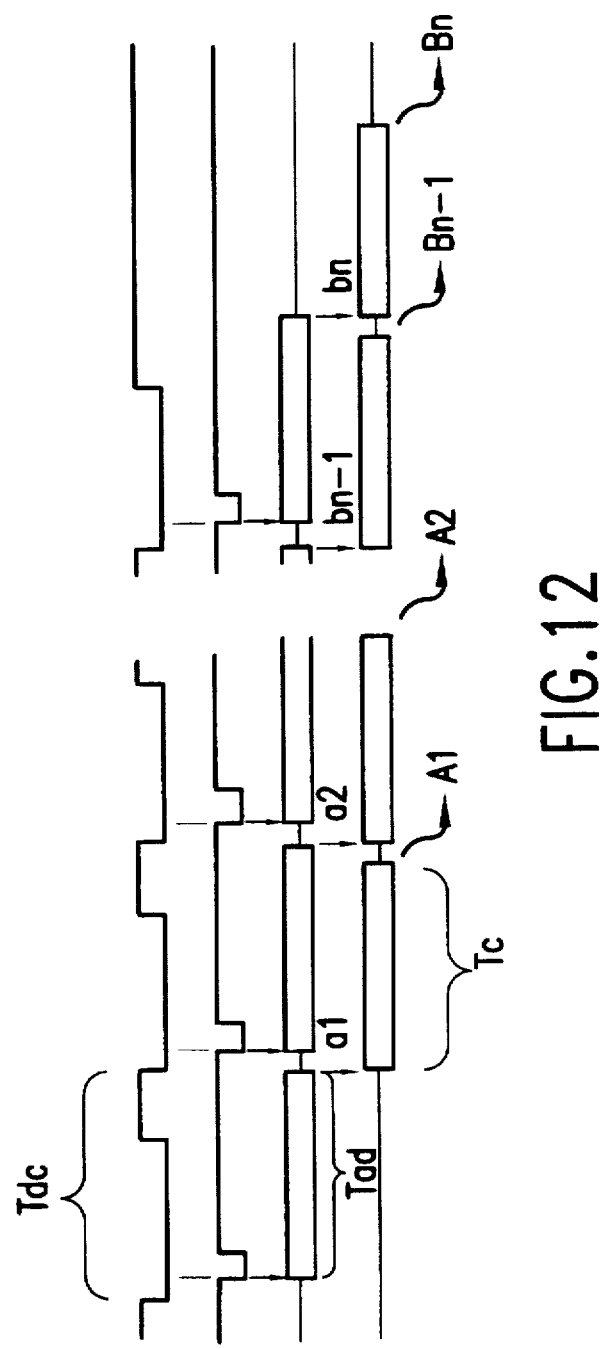
FIG. 12 is a timing chart illustrating an embodiment of the present invention.

In step S105, an analog signal output starting command is issued to the image sensor 8 via the IO port 195. Responding to the output start command, the image sensor 8 periodically generates an AD synchronous signal (time interval Tdc) that specifies the timing of the commencement of the analog-to-digital conversion of the analog signals (from the sensor) corresponding to the pixels α1-αn and β1-βn and the sensor signals, as illustrated in FIG. 12, the AD synchronous signals being predetermined to interrupt the one-chip microcomputer 9 during the decay of the output start command.

Moreover, the analog-to-digital conversion and correction of the analog signals are processed during the interruption program, explained hereafter. At step S106 the main program checks to see if the counter E has reached 2n. When the counter reaches 2n, completion of the correction of all of the digital data is complete.

Upon completion of the correction of all of the digital data, computation of the defocus amount DEF is accomplished by executing the above focus detection algorithm process for the corrected data at step S107.

In step S108, the lens driving amount is computed from the defocus amount DEF. In step S109, driving of the motor 10 is controlled via the IO port 195 based upon the lens driving amount obtained in step S108. After the lens driving control is executed at step S109, the CPU returns to step S103 and repeats the above operations.

Figure 10:
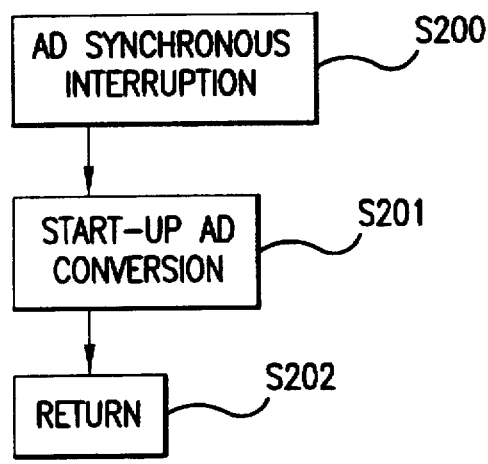
FIG. 10 is a flow chart illustrating the operation of an embodiment of the present invention.

FIG. 10 is a flow chart illustrating an interruption process accomplished by means of AD synchronous signals.

In step S200, interruption commences with a drop in the AD synchronous signals. Analog-to-digital conversion is initiated in step S201 through the issuance of CPU commands to the analog-to-digital converter 190, upon which the CPU returns in step S202.

Upon receiving the AD start command from the CPU 193, the analog-to-digital converter 190 sample-holds the sensor output and begins analog-to-digital conversion, the time required for analog-to-digital conversion being denoted as Tad. With the completion of the analog-to-digital conversion, the analog-to-digital converter 190 executes internally AD conversion completion interruption with regard to the CPU 193.

Figure 11:
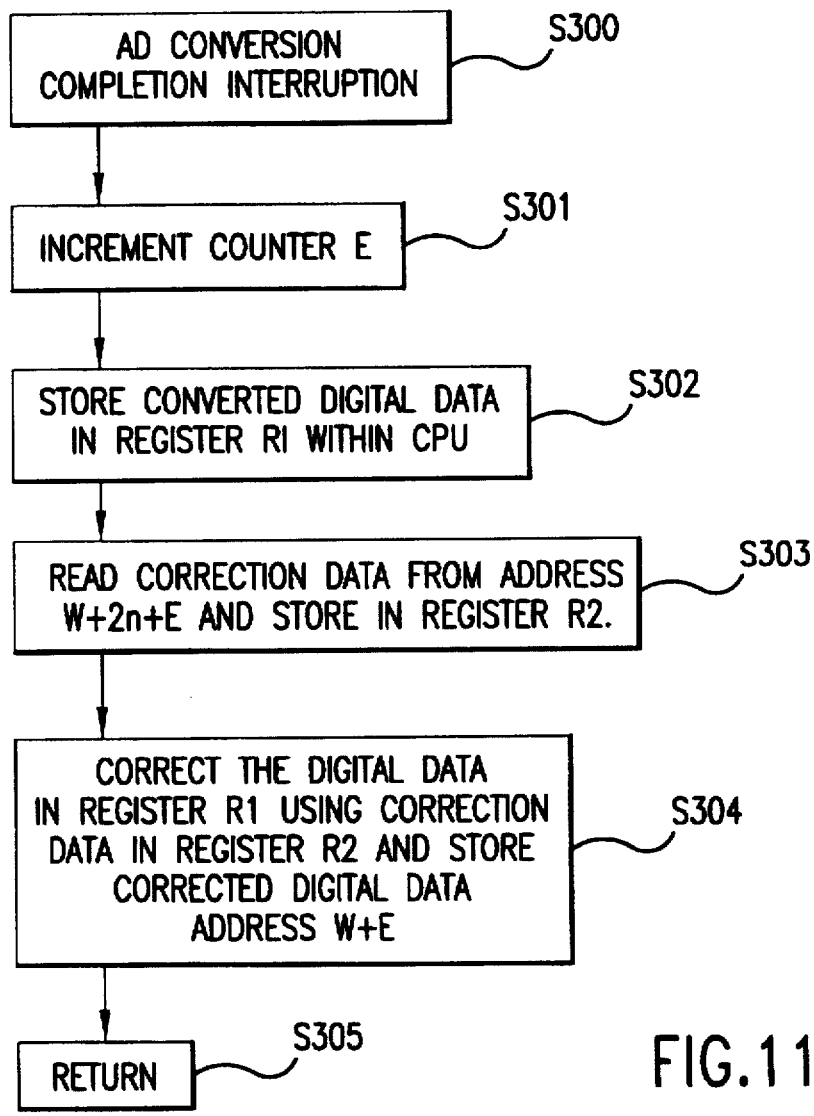
FIG. 11 is a flow chart illustrating the operation of an embodiment of the present invention.

FIG. 11 is a flow chart that depicts the interruption process triggered by the completion of the analog-to-digital conversion.

In step S300, interruption is triggered during the decay time of analog-to-digital conversion completion.

In step S301, counter E is incremented.

In step S302, the AD-converted digital data are read from the analog-to-digital converter 190 and stored in register R1.

In step S303, the correction data of address (W+2n+E) corresponding to the contents of the counter in the RAM 192 are read and stored in register R2. In this instance, W represents the specific fixed address.

In step S304, a correction algorithm is executed using the digital data stored in register R1, the correction data stored in R2, and equations 2. The corrected data are stored in address (W+E) corresponding to the contents of the counter in the RAM 192 described in Table 1.

The CPU then returns in step S305.

Tc denotes the time required for completion of the above process, in which the CPU completes the above process before the next AD conversion completion interruption is triggered.

The CPU is set up to take the interruption process by means of AD synchronous signals before the interruption process by AD conversion completion. The interruption process of FIG. 10 is executed if interruption by AD synchronous signals is triggered during the process shown in FIG. 11.

Since the correction algorithm takes place during analog-to-digital conversion, as described above, the correction algorithm is completed virtually at the same time as the completion of sensor output, thus effectively shortening the response time of the system.

In executing the correction algorithm during analog-to-digital conversion in the manner described above, the time required to read the correction data becomes a concern, and if the correction data are read by means of serial communication from the non-volatile memory 11 at a slower reading speed, the output interval Tdc for sensor output must be made longer, resulting in a poor system response characteristic.

In the explanation of the above algorithm, the correction data transfer program is accomplished in step S101, the correction program being accomplished in steps S300-S305, and the processing program being accomplished in step S107. Thus, the correction program and the processing program are repeatedly executed in sequence by a loop from step S103 through step S109 in the main program, the correction data transfer program being executed when once triggered by the turning on of the power source independent of the sequence.

In the above explanation of the first embodiment of the present invention, the correction algorithm is performed concurrently with analog-to-digital conversion. However, even in the case when the AD-converted digital data are once stored in the RAM and where the correction algorithm is accomplished after all the digital data are stored, the present invention has an advantage in that the correction data are read from RAM, which is capable of high speed reading.

According to the above explanation of the first embodiment of the present invention, a re-imaging lens is used to compose an image on the image sensor 8 from concerning the focus detection optical system 7, in which case a spherical mirror can be used instead of a lens as long as it is an image re-imaging device capable of composing an image. Moreover, the image sensor 8 can be comprised of a CCD or MOS type image sensor. Although in the explanation of the light receiving units in the image sensor 8 a multiplicity of pixels arranged linearly is specified, the same results can be obtained with a 2-dimensional array such as an area sensor.

In the first embodiment, the correction data are transferred from the nonvolatile memory 11 to RAM 192 when the power source 14 is turned on. In the second embodiment (FIG. 14), an example in which the present invention is applied to an automatic focus detection system with two focus detection areas is provided. The system is capable of switching the focus detection areas. The structure of the second embodiment is substantially the same as FIG. 1; hence, explanations of sections common to the first embodiment will be omitted.

Figure 13:
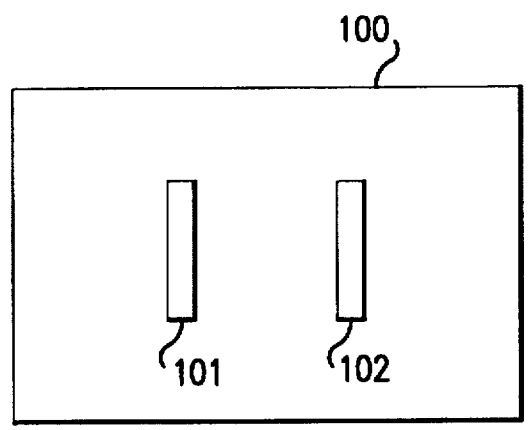
FIG. 13 is a figure illustrating the focus detection area according to a second embodiment of the present invention.

FIG. 13 illustrates the focus detection areas 101 and 102 established inside the photo field 100 of the finder 6. The two focus detection areas 101 and 102 are realized by providing two AF modules (comprising the focus detection optical system 7 and the image sensor 8) having the single focus detection area described in FIG. 2.

Figure 14:
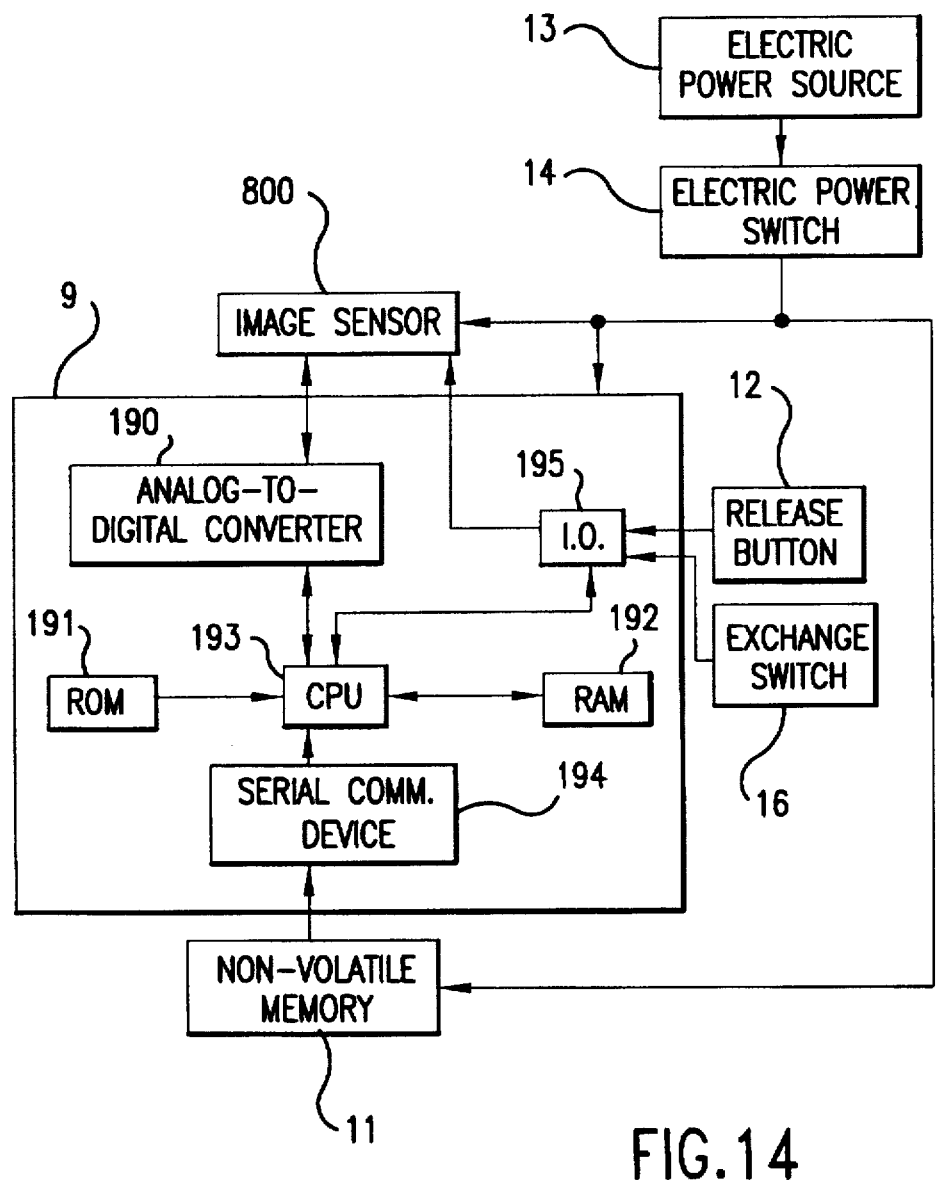
FIG. 14 is a block diagram illustrating the one-chip microcomputer according to the second embodiment of the present invention.

FIG. 14 is a block diagram showing the circuit formed on the semiconductor circuit board of the one-chip microcomputer 9 according to a second embodiment of the present invention. Explanations of parts common to FIG. 8 will be omitted. Differences in FIG. 14 in comparison with the first embodiment of FIG. 8 lie in the fact that the image sensor 800 of FIG. 14 is equipped with two pairs of light receiving units corresponding to the two focus detection areas, and that a switch 16 is added to switch the two focus detection areas.

In this instance, AH1-AHn and BH1-BHn denote correction data to correct the output from pixels that make up a pair of light receiving units corresponding to the focus detection area 101 of the image sensor 800, and A1-An and B1-Bn denote the corrected output from pixels that make up the pair of light receiving units. CH1-CHn and DH1-DHn denote correction data to correct the output from pixels that make up a pair of light receiving units corresponding to the focus detection area 102 of the image sensor 800, and C1-Cn and D1-Dn denote the corrected output from pixels that make up the pair of light receiving units.

The correction data AH1-AHn, BH1-BHn, CH1-CHn, and DH1-DHn are stored in the nonvolatile memory 11. Furthermore, to save memory space, the RAM 192 is made to store only the data corresponding to the focus detection area established by the switch 14.

Table 1 is a memory map of RAM 192 when the focus detection area 101 is established, and Table 2 is a memory map of RAM 192 when the focus detection area 102 is established.

TABLE 1

Address map of RAM

| Address | Contents | |
|---|---|---|
| W + 1 | A1: | Corrected data sensor output A1 |
| W + 2 | A2: | Corrected data sensor output A1 |
| " | " | " |
| " | " | " |
| W + n | An | Corrected data of sensor output An |
| W + n + 1 | B1 | Corrected data of sensor output B1 |
| W + n + 2 | B2 | Corrected data of sensor output B2 |
| " | " | " |
| " | " | " |
| W + 2n | Bn | Corrected data of sensor output Bn |
| W + 2n + 1 | AH1 | Correction data of sensor output A1 |
| W + 2n + 2 | AH2 | Correction data of sensor output A2 |
| " | " | " |
| " | " | " |
| W + 3n | AHn | Correction data of sensor output An |
| W + 3n + 1 | BH1 | Correction data of sensor output B1 |
| W + 3n + 2 | BH2 | Correction data of sensor output B2 |
| " | " | " |
| " | " | " |
| W + 4n | BHn | Correction data of sensor output Bn |

TABLE 2

Address map of RAM

| Address | Contents | |
|---|---|---|
| W + 1 | C1: | Corrected data sensor output C1 |
| W + 2 | C2: | Corrected data sensor output C2 |
| " | " | " |
| " | " | " |
| W + n | Cn | Corrected data of sensor output Cn |
| W + n + 1 | D1 | Corrected data of sensor output D1 |
| W + n + 2 | D2 | Corrected data of sensor output D2 |
| " | " | " |
| " | " | " |
| W + 2n | Dn | Corrected data of sensor output Dn |
| W + 2n + 1 | CH1 | Correction data of sensor output C1 |
| W + 2n + 2 | CH2 | Correction data of sensor output C2 |
| " | " | " |
| " | " | " |
| W + 3n | CHn | Correction data of sensor output Cn |
| W + 3n + 1 | DH1 | Correction data of sensor output D1 |
| W + 3n + 2 | DH2 | Correction data of sensor output D2 |
| " | " | " |
| " | " | " |
| W + 4n | DHn | Correction data of sensor output Dn |

The IO port 195 is connected to the switch 16, enabling the switch setting condition to be read into the CPU 193. IO port 195 is also connected to the image sensor 800, enabling communication of control commands from the CPU 193 to the image sensor 800, and enabling the image sensor 800 to output analog signals of the pair of light receiving units to correspond to the focus detection area specified by the switch 16.

Figure 15:
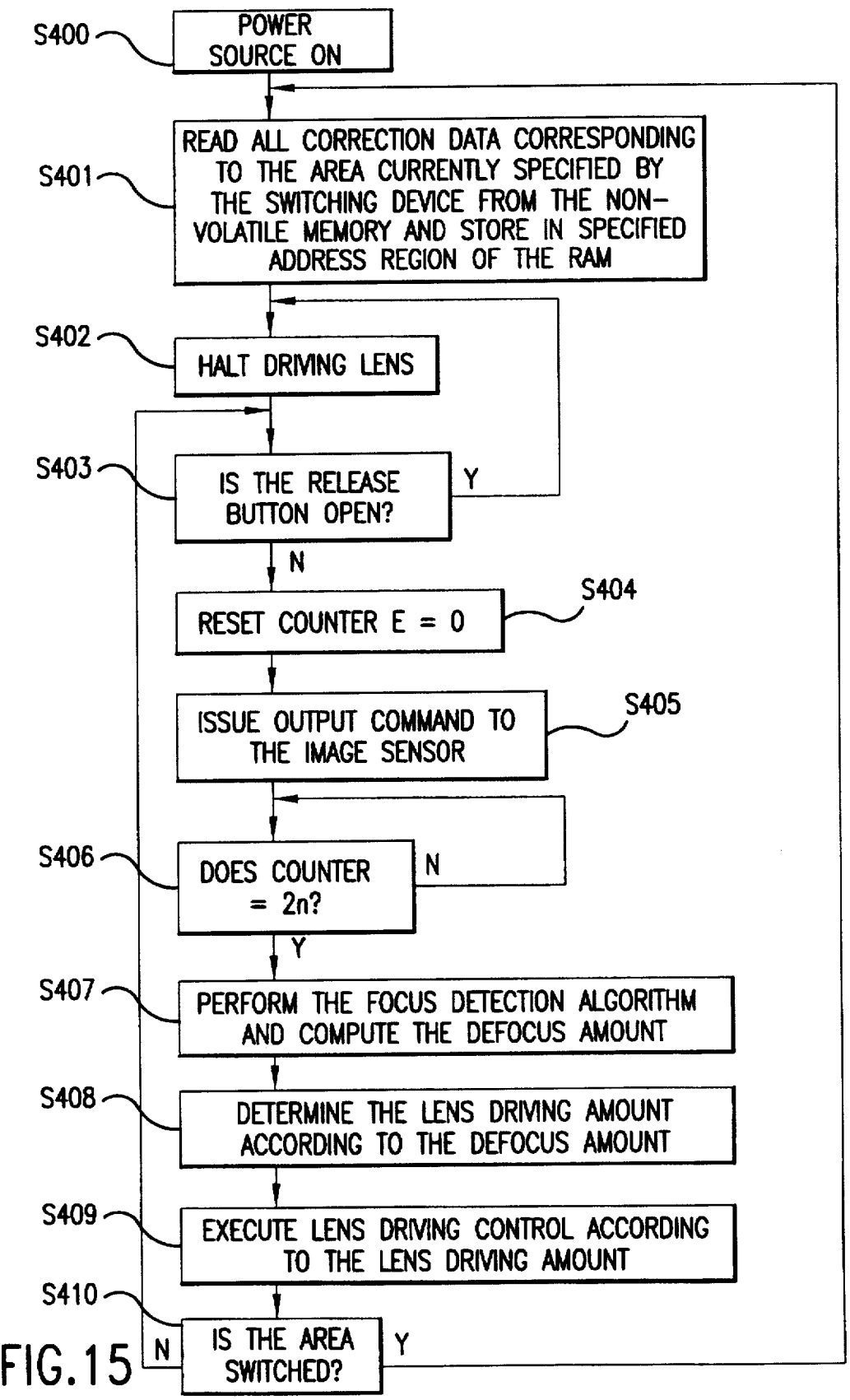
FIG. 15 is a flow chart illustrating the operation of the second embodiment of the present invention.

Operation of the CPU 193 is described hereafter, with reference to FIG. 15. The interruption process is the same as in the first embodiment in FIGS. 10 and 11 except for a portion of the main program, as described below.

FIG. 15 is a flow chart of the main program stored in the ROM 191, which runs the CPU 193 in the second embodiment of the present invention.

Explanations concerning FIG. 15 are the same as in FIG. 9 and are omitted except for steps S401, S405 and S410.

In step S401, the setting condition of the switch 16 (switching means) is detected by means of the IO port 195, and the correction data corresponding to a specified focus detection area are read from the nonvolatile memory 11 by means of the serial communication device 194. The correction data are stored in an address region of the RAM 192 as shown in Table 1 or Table 2.

In step S405, the output start command is issued to the image sensor 800 via the IO port 195 to start outputting analog signals from a pair of light receiving units corresponding to the focus detection area specified by the switch 16.

Once lens driving control is started at step S409, the setting condition of the switch 16 is detected via the IO port 195 in step S410, a check being made relative to the switching of the focus detection area. If the area is not switched, the CPU 193 returns to step S403, and the operation is repeated starting in step S403.

If the focus detection area is switched, the CPU 193 returns to step S401, and the correction data corresponding to the switched focus detection area are read from the nonvolatile memory 11 via the serial communication device 194 and are stored in the address region of the RAM 192 as shown in Table 1 or Table 2.

In the explanation of the algorithm, the correction data transfer program is accomplished in step S401, the correction program is accomplished in steps S300-S305, and the processing program is accomplished in step S407. Thus, the correction program and the processing program are repeatedly executed in sequence by means of the loop included from step S403 through step S410 in the main program, but the correction data transfer program is executed when once triggered by the turning on of the power source and the switching of the focus detection area, independent of the sequence of the main program.

In the first embodiment shown in FIG. 8, considering the characteristics of the focus detection optical system and the dispersion among pixels of the image sensor, correction is made so that the digital data of a subject with uniform illumination would assume uniform values after correction. However, in the third embodiment described below in connection with FIG. 16, the dark current component of each pixel of the image sensor is corrected.

Explanations other than the explanation regarding the correction algorithm will be omitted since they are the same as in the first embodiment.

Figure 16:
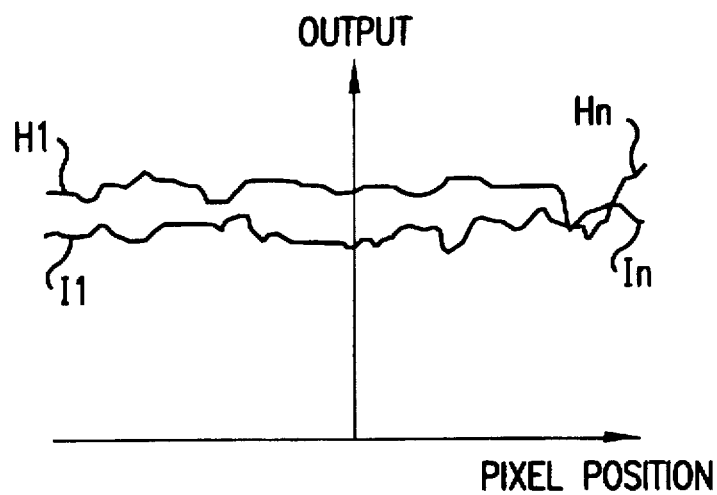
FIG. 16 is a graph illustrating the correction principle according to a third embodiment of the present invention.
Figure 17:
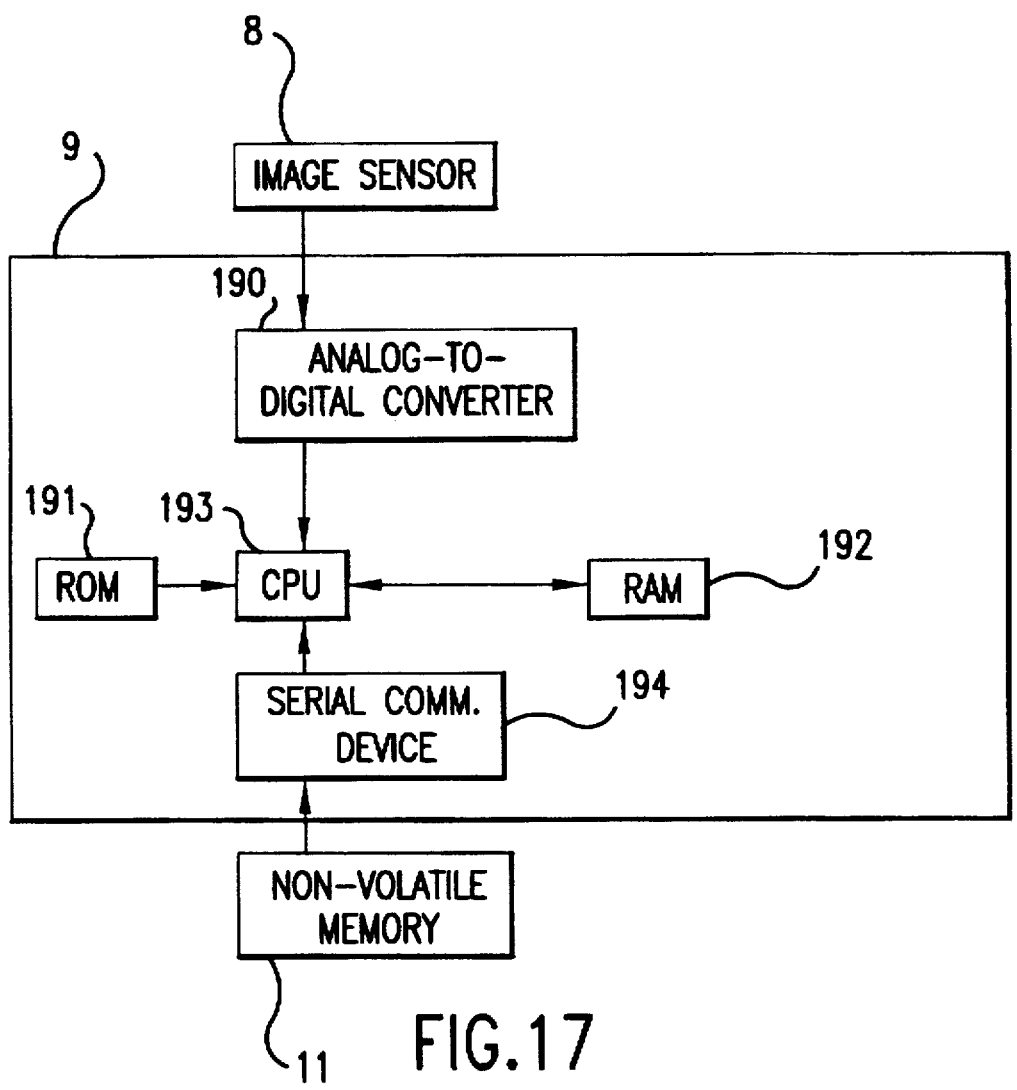
FIG. 17 is a block diagram illustrating a conventional one-chip microcomputer.

FIG. 16 illustrates the dark time output (dark current component) H1-Hn of pixels α1-αn and the dark time output (dark current component) I1-In of pixels β1-βn, where α1-αn and β1-βn respectively represent, in order of rows, pixels that make up the light receiving units 80 and 81. FIG. 16 shows the dispersion in dark time output among the pixels.

The following is an example of correction.

The correction data AH1-AHn for the digital data of pixels α1-αn and the correction data BH1-BHn for the digital data of pixels β1-βn are defined by equations (9).

$$AHi = Hi \; i = 1 \sim n \quad (9)$$
$$BHi = Ii \; i = 1 \sim n$$

The correction data AH1-AHn and BH1-BHn defined by equations (9) may differ for any particular image sensor 8. Therefore, the correction data are written in the nonvolatile memory 11 for each camera during the assembly process as an adjustment value. Moreover, the temperature of the image sensor 8 from which the dark time output is obtained to create the correction data is maintained constant. In the case when the image sensor 8 is comprised of an electric charge accumulation type image sensor, the electric charge accumulation time is preset at a specific time interval.

In general, correction for the digital data a1-an of pixels α1-αn and for the digital data b1-bn of pixels β1-βn is computed by equations (10), thereby obtaining the corrected digital data A1-An and B1-Bn.

$$Ai = ai - k \times r \times Hi \; i = 1 \sim n \quad (10)$$
$$Bi = bi - k \times r \times Ii \; i = 1 \sim n$$

In equations (10), k represents a correction coefficient that varies with the environmental temperature of the image sensor 8 during the time of obtaining the digital data a1-an and b1-bn. Unit r represents a correction coefficient used when the image sensor 8 is comprised of an electric charge accumulation type image sensor and varies with the amount of electric charge accumulation time during the time of obtaining the digital data a1-an and b1-bn.

In the first, second and third embodiments of the present invention, as described above, the present invention is applied to the automatic focus adjustment of a camera. However, the present invention is applicable to a subject illumination photometric system of a camera using an image sensor as well as an automatic focus adjustment, and is also applicable to any image sensor system other than a camera, as long as the system uses an image sensor.

As described above, with the present invention, once all of the correction data are read from the nonvolatile memory and stored in RAM, the nonvolatile memory, which has a relatively slow reading speed, is not accessed again, and all of the correction data are made to reside in RAM. During the correction algorithm of the digital data, the correction data are read from RAM, which has a high speed reading capability, and are used in the correction algorithm. The time required for correcting all of the digital data is shortened, thus enabling an improvement in the system's response characteristics.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image sensor system comprising:

an image sensor having a multiplicity of pixels each producing analog signals, the pixels having photoelectric conversion capability;

an analog-to-digital converter receiving the analog signals, the analog-to-digital converter converting the analog signals into digital data;

a non-volatile memory that stores a plurality of correction data for correcting the digital data;

a volatile memory having a higher data reading speed than the non-volatile memory;

a read only memory that stores a correction data transfer program for transferring the correction data from the non-volatile memory to the volatile memory, a correction program for reading the correction data from the volatile memory and correcting the digital data using the correction data, and for storing the corrected digital data in the volatile memory, and a processing program for executing a predetermined process on the corrected digital data, wherein the volatile memory and the read only memory are located on a one-chip microcomputer and the non-volatile memory is independently located from the one-chip microcomputer;

a controller communicating with the analog-to-digital converter, the non-volatile memory, the volatile memory and the read only memory, the controller executing the correction data transfer program, the correction program and the processing program, wherein the controller repeatedly executes the correction program and the processing program in sequence and executes the correction data transfer program independent of the correction and processing programs; and a power source that supplies power to the image sensor system, wherein the controller starts and executes the correction data transfer program when the power source is initialized.

2. An image sensor system according to claim 1, wherein the analog-to-digital converter, the read only memory, the volatile memory and the controller are located on a one-chip microcomputer, and wherein the image sensor and the non-volatile memory are formed on a semiconductor chip separate from the one-chip microcomputer.

3. An image sensor system according to claim 2, wherein the one-chip microcomputer includes a serial communication device that executes serial data communication between the one-chip microcomputer and devices external to the one-chip microcomputer.

4. An image sensor system according to claim 3, wherein the volatile memory and the serial communication device are connected to the controller by a parallel data bus, and wherein the non-volatile memory and the serial communication device are connected by a serial data bus.

5. An image sensor system according to claim 1, wherein the image sensor includes a plurality of light receiving units and a switching device that alternates activation of the light receiving units, and wherein the controller starts and executes the correction data transfer program when the switching device alternates between the light receiving units.

6. An image sensor system according to claim 1, wherein the correction data correct a dispersion of a dark current component of the digital data.

7. An image sensor system according to claim 1, further comprising an optical system that forms a subject image on the image sensor, wherein the correction data are predetermined so as to cause the corrected digital data to assume uniform values when the subject image is under uniform illumination.

8. An image sensor system according to claim 7, wherein the correction data corrects a sensitivity dispersion of the digital data.

9. An image sensor system according to claim 1, wherein the image sensor system is applied to a focus detection system in a photo-optical system, the image sensor system having a pair of light receiving units and a pair of light composing devices that recompose a subject image formed by the photo-optical system onto the pair of light receiving units as a pair of recomposed images, wherein the processing program executes a correlation algorithm process for a pair of the corrected digital data corresponding to the pair of images to detect a focus adjustment condition of the photo-optical system.

10. An image sensor system according to claim 1, wherein the controller executes the correction program during analog-to-digital conversion by the analog-to-digital converter.

11. An image sensor system comprising:

an image sensor having a plurality of pixels;

a non-volatile memory that stores a plurality of correction data for correcting data output from each pixel of the image sensor;

a volatile memory to temporarily maintain said plurality of correction data;

correction means for correcting the data output from each pixel based on the correction data maintained in and read from the volatile memory; and data transfer means for transferring all of said plurality of correction data at a given time from said non-volatile memory to said volatile memory during a time when power is initially supplied to said image sensor system.

12. An image sensor system comprising:

an image sensor having a plurality of pixels;

a non-volatile memory that stores a plurality of correction data for correcting data output from each pixel of the image sensor;

a volatile memory having a higher data reading speed than the non-volatile memory;

data transfer means for transferring all of said plurality of correction data simultaneously, and independently of a correction means and a processing means, from said non-volatile memory to said volatile memory, the data transfer means including a serial communication device that transfers the correction data from the non-volatile memory to the volatile memory;

a power source that supplies power to the image sensor system, wherein the data transfer means transfers all of said plurality of correction data when the power source is initialized; and the correction means correcting the data output from each pixel based on the correction data transferred to and read from said volatile memory.

13. An image sensor system comprising:

image sensing means having a multiplicity of pixels for producing analog signals, the pixels having photoelectric conversion capability;

converting means for converting the analog signals into digital data;

non-volatile memory means for storing a plurality of correction data for correcting the digital data;

a volatile memory having a higher data reading speed than the non-volatile memory means;

read only memory means for storing a correction data transfer program that transfers the correction data from the non-volatile memory to the volatile memory, a correction program that reads the correction data from the volatile memory and corrects the digital data using the correction data and stores the corrected digital data in the volatile memory, and a processing program that executes a predetermined process on the corrected digital data, wherein the volatile memory and the read only memory means are located on a one-chip microcomputer and the non-volatile memory is independently located from the one-chip microcomputer;

central processor means for executing the correction data transfer program, the correction program and the processing program by repeatedly executing the correction program and the processing program in sequence and for executing the correction data transfer program independent of the correction and processing programs; and a power source that supplies power to the image sensor system, wherein the central processor means starts and executes the correction data transfer program when the power source is initialized.

14. An image sensor system according to claim 13, wherein the converting means, the read only memory means, the volatile memory and the central processing means are located on the one-chip microcomputer, and wherein the image sensing means and the non-volatile memory are located on a semiconductor chip separate from the one-chip microcomputer.

15. An image sensor system according to claim 14, further comprising serial communication means for executing serial data communication between the one-chip microcomputer and devices external to the one-chip microcomputer.

16. An image sensor system according to claim 13, wherein the central processing means causes the correction data to correct a dispersion of a dark current component of the digital data.

17. An image sensor system according to claim 13, further comprising an optical means for forming a subject image on the image sensor means, wherein the correction data are predetermined so as to cause the corrected digital data to assume uniform values when the subject image is under uniform illumination.

18. An image sensor system according to claim 13, wherein the central processing means causes the correction data to correct a sensitivity dispersion of the digital data.

19. A method of correcting data in an image sensor system having an image sensor with a multiplicity of pixels each producing analog signals and a volatile memory having a higher data reading speed than the non-volatile memory, the method comprising:

converting the analog signals into digital data;

storing a plurality of correction data for correcting the digital data in a non-volatile memory;

storing, in a read only memory, a correction data transfer program for transferring the correction data from the non-volatile memory to the volatile memory, a correction program for reading the correction data from the volatile memory and correcting the digital data using the correction data and for storing the corrected digital data in the volatile memory, and a processing program for executing a predetermined process on the corrected digital data, wherein the volatile memory and the read only memory are located on a one-chip microcomputer and the non-volatile memory is independently located from the one-chip microcomputer; and executing the correction data transfer program, the correction program and the processing program, the executing step comprising repeatedly executing the correction program and the processing program in sequence and executing the correction data transfer program independent of the correction and processing programs; and supplying power, from a power source, to the image sensor system, whereby the step of executing the correction data transfer program starts when the power source is initialized.

20. A method according to claim 19, wherein the image sensor includes a plurality of light receiving units and a switching device that switches between activation of the light receiving units, the method further comprising starting and executing the correction data transfer program when the switching device switches between the light receiving units.

21. A method according to claim 19, further comprising correcting a dispersion of a dark current component of the digital data.

22. A method according to claim 19, further comprising:

forming a subject image on the image sensor; and presetting the correction data so as to cause the corrected digital data to assume uniform values when the subject image is under uniform illumination.

23. A method according to claim 19, further comprising correcting a sensitivity dispersion of the digital data.

24. A method according to claim 19, wherein the image sensor system is applied to a focus detection system in a photo-optical system, the image sensor system having a pair of light receiving units and a pair of light composing devices that recompose a subject image formed by the photo-optical system onto the pair of light receiving units as a pair of recomposed images, the method further comprising detecting a focus adjustment condition of the photo-optical system by executing a correlation algorithm process for a pair of the corrected digital data corresponding to the pair of recomposed images.

25. A method according to claim 19, further comprising executing the correction program during the conversion of the analog signals to digital data.

* * * * *